(12) United States Patent
Seel (10) Patent No.: US 9,021,418 B2
(45) Date of Patent: Apr. 28, 2015

(54) SYSTEMS AND/OR METHODS FOR CREATION OF METAMODELS

(75) Inventor: Christian Seel, Saarbrucken (DE)

(73) Assignee: Software AG, Darmstadt (DE)

( * ) Notice: Subject to any disclaimer, the term of this patent is extended or adjusted under 35 U.S.C. 154(b) by 1109 days.

(21) Appl. No.: 12/974,440

(22) Filed: Dec. 21, 2010

(65) Prior Publication Data

US 2012/0159426 A1 Jun. 21, 2012

(51) Int. Cl.
*G06F 9/44* (2006.01)
(52) U.S. Cl.
CPC ... *G06F 8/10* (2013.01); *G06F 8/30* (2013.01); *G06F 8/36* (2013.01); *G06F 8/33* (2013.01)
(58) Field of Classification Search
CPC ............. G06F 9/44; G06F 8/00; G06F 15/16; G06F 8/30; G06F 8/33; G06F 8/36
USPC ....................................................... 717/104
See application file for complete search history.

(56) References Cited

U.S. PATENT DOCUMENTS

| | | | |
|---|---|---|---|
| 6,711,734 B1 | 3/2004 | Baisley | |
| 6,751,631 B2 | 6/2004 | Hrebejk | |
| 7,426,523 B2 | 9/2008 | Schroeder | |
| 7,673,283 B2 | 3/2010 | Gutz | |
| 7,890,923 B2 * | 2/2011 | Elaasar | 717/104 |
| 2002/0104068 A1 * | 8/2002 | Barrett et al. | 717/104 |
| 2003/0023413 A1 * | 1/2003 | Srinivasa | 703/2 |
| 2003/0149552 A1 | 8/2003 | Srinivasa | |
| 2007/0055972 A1 * | 3/2007 | Brown et al. | 717/174 |
| 2008/0082959 A1 * | 4/2008 | Fowler | 717/104 |
| 2008/0092111 A1 * | 4/2008 | Kinnucan et al. | 717/105 |
| 2008/0229277 A1 * | 9/2008 | Devarakonda et al. | 717/104 |
| 2009/0132562 A1 * | 5/2009 | Mehr et al. | 707/100 |
| 2013/0196658 A1 * | 8/2013 | Fedor et al. | 455/434 |

OTHER PUBLICATIONS

Microsoft DSL-Tools for Visual Studio, http://msdn.microsoft.com/de-de/library/bb932387%28v=VS.90%29.aspx 1 page (2010).
MetaCase MetaEdit+,http://www.metacase.com/MetaEdit.html, 1 page (2010).
Eclipse Model Development Tools (MDT), http://www.eclipse.org/modeling/mdt/?project=uml2tools, pp. 1-4 (2010).

(Continued)

*Primary Examiner* — John Breene
*Assistant Examiner* — Lynda Dinh
(74) *Attorney, Agent, or Firm* — Nixon & Vanderhye PC (57) ABSTRACT

Certain example embodiments described herein relate to systems and/or methods for systems and/or methods for improved creation of metamodels. More particularly, certain example embodiments described herein relate to automating the creation of metamodels from one or more example models. In certain example embodiments, nodes, edges, and multiplicities of at least one model are automatically identified. A preliminary metamodel is created by adding a metaclass for each automatically identified node and edge. A connection is made between each said added metaclass edge to at least two said added metaclass nodes via first and second associations. Detection of multiple relations is performed by determining whether any of said added metaclass edges are connected to more than two added metaclass nodes. The preliminary metamodel is refined or optimized, e.g., so as to reduce the occurrence of multiple relations.

18 Claims, 9 Drawing Sheets

(56) References Cited

OTHER PUBLICATIONS

Troux Architect and Metaverse, http://www.troux.com/products/troux_architect/, pp. 1-3 (2010).

Behzad Bordbar, Athanasios Staikopoulos: *Automated Generation of Metamodels for Web service Languages*. http://citeseerx.ist.psu.edu/viewdoc/download?doi+10.1.1.106.6193&rep+repl&type+pdf, pp. 1-14. Sep. 2-6, 2002.

Dimitris Karagiannis, Harald Kühn: Metamodelling Platforms. In Proceedings of the 3rd International Conference ECWeb—Dexa 2002, Metamodelling Platforms (2002), http://www.dke.univie.ac.at/mmp/FullVersion_MMP_DexaECWeb2002.pdf, pp. 1-8, Mar. 2004.

Search Report issued on Mar. 20, 2012 in corresponding European Application No. 11152334.

* cited by examiner

SYSTEMS AND/OR METHODS FOR CREATION OF METAMODELS

FIELD OF THE INVENTION

Certain example embodiments described herein relate to systems and/or methods for creation of metamodels. More particularly, certain example embodiments described herein relate to the creation of metamodels from one or more example models. In certain example embodiments, a metamodel creation engine receives one or more example model(s) and uses the models to automatically create a metamodel.

BACKGROUND AND SUMMARY OF EXAMPLE EMBODIMENTS OF THE INVENTION

Models provide a technique for abstracting real world events, attributes, etc. The creation of these models typically involves domain specific challenges and issues. Metamodels provide a further abstraction of a model and may abstract the above domain specific challenges associated with models. A metamodel highlights or defines the properties of how the individual models are to be built. Many different modeling languages implement the above model and metamodel features through graphical user interfaces (GUIs) that allow disparate industries and areas of application to take advantage of optimization of business practices or software development.

Figure 1:
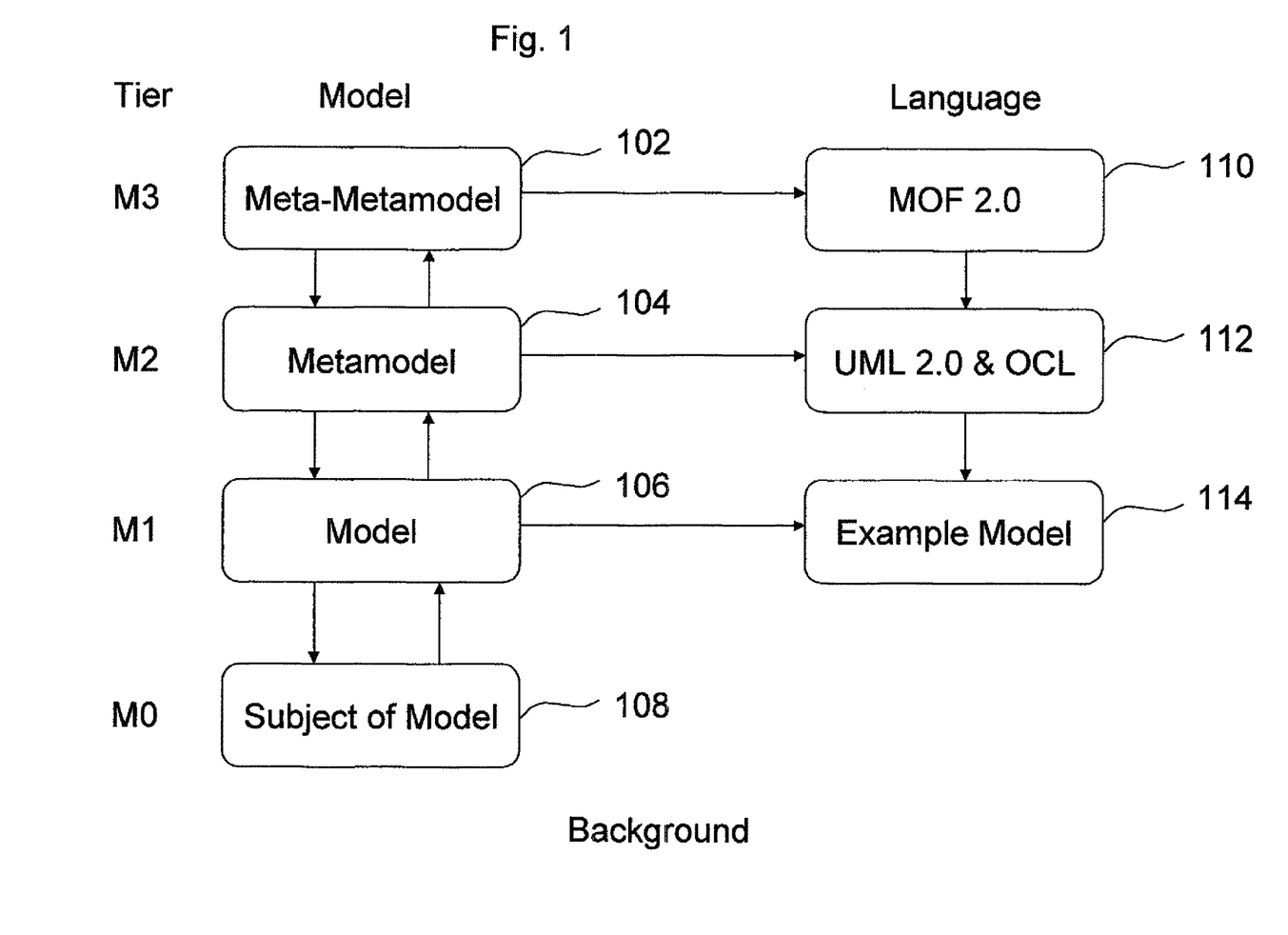
FIG. 1 is an example diagram showing the different tiers of a modeling architecture.

The international standardization organization Object Management Group (OMG) defines a four level standard architecture. FIG. 1 shows the standard four tiers from the OMG-defined architecture. The subject of the model 108 is at tier M0, which is the object to be analyzed with a graphical model. This is also sometimes referred to as the data layer that may be used to describe real-world objects.

At tier M1 is the graphical model 106 of the regarded object on level M0. The model 106 may be expressed as an example model 114 (or a series of example models). The model may be represented in a modeling language such as the UML (Unified Modeling Language) or the like. Models at tier M1 are usually created in a clearly defined notation, rather than with arbitrary modeling elements and symbols. One reason for this is that the meaning of the defined model could be unclear on such an abstract level and thus may not be implementable (e.g., the model may be too domain specific).

Tier M2 generally defines the modeling elements and their relations. The definition of the syntax of the modeling language used in model 106 is called the metamodel 104. In addition to defining the elements used to create a model, metamodels are also used in order to specify the data structures that are needed to represent a model on any storage. At tier M2, the metamodel 104 may be expressed in a language. A common example is the UML metamodel, the model that describes UML.

At the highest level is tier M3, which includes the meta-metamodel 102. This defines the modeling language that is used in order to create a metamodel. As with the tier described above, meta-metamodels can be expressed in a language. OMG uses the "Meta Object Facility" (MOF) 110 standard for defining the specification of metamodels. This standard uses UML 2.0 class diagrams and the Object Constraint Language (OCL) in order to specify a metamodel.

Thus, a meta-metamodel language such as MOF 2.0 may in turn specify a metamodel language such as UML 2.0 and OCL. These languages in turn may be used to specify a particular model (e.g., the business practice of a company).

It will be appreciated that if the metamodel is defined such that it is compatible with industry standards, then it can be used for the generation of modeling tools, for the specification of storage formats, the documentation of modeling language, etc. Specifications are especially useful in the form of so-called domain specific languages (DSLs). These languages are usually not completely new but instead are typically derived from standard modeling languages and cover the special issues of a particular domain. DSLs may speed software development in a given domain because the needed modeling elements are provided in a more direct way.

Conventionally, tools that support and identify metamodels as assets do so though graphical metamodeling editors. The creation of these metamodels through such tools is a process in which a user manually creates a given metamodel.

One technique of automating the creation of metamodels involves providing other metamodels to create more metamodels or, in other words, converting one M2 tier model into another M2 tier model. Another conventional technique is the automatic creation of models out of metamodels. For example, UML models (e.g., at tier M1) may be created out of MOF metamodels. Accordingly some amount of automatic creation of models and/or metamodels has been achieved. However, those skilled in the art will appreciate that more work is still needed to reduce the manual task of model, metamodel, and/or meta-metamodel creation.

One aspect of certain example embodiments relates to the creation of metamodels in an automated process. In certain example embodiments, the automated process is a method implemented on a processing system.

Another aspect of certain example embodiments relates to providing a procedure from the creation of metamodels that is scalable and/or non NP-complete. In certain example embodiments, a large number of example models may be used in order to generate a metamodel.

Another aspect of certain example embodiments is the optimization of a generated metamodel. In certain example embodiments, the complexity of the metamodel is reduced during the optimization process. In certain example embodiments, abstract model elements are used that reduce the number of edges and/or nodes in a generated metamodel.

Still another aspect of certain example embodiments relates to the extension of existing modeling languages as well as their generation from scratch.

Still aspect of certain example embodiments relates to providing a graphical visualization that uses nodes, edges, and/or container nodes (e.g., nodes that enclose nodes, edges, and other container nodes).

Yet another aspect of certain example embodiments relates to generating a metamodel that follows OMG standards MOF, which may be based on the UML 2.0 class diagram and OCL standards.

Yet another aspect of certain example embodiments relates to allowing users with little or no technical background to use and/or produce the generated metamodels.

In certain example embodiments, a method of creating a metamodel for use with a processing system including at least one processor is provided. Nodes, edges, and multiplicities are automatically identified from at least one example model. A preliminary metamodel is created by (a) adding to the preliminary metamodel a corresponding metaclass node for each said automatically identified node in the at least one model and a corresponding metaclass edge for each said automatically identified edge in the at least one model, and (b) connecting each said added metaclass edge to at least two said added metaclass nodes via first and second associations, with the first and second associations having opposite directions and having respective multiplicities associated therewith. Detection as to whether multiple relationships exist is performed by determining whether any of said added metaclass edges are connected to more than two added metaclass nodes. The preliminary metamodel is refined when it is determined that at least one multiple relationship exists so as to create a refined metamodel, but otherwise the preliminary metamodel is treated as the refined metamodel.

In certain example embodiments, a metamodel creation system is provided with at least one processor, display, and user input adapter for receiving user input. The system may be configured to automatically identify nodes, edges, and multiplicities of at least one example model. The system may be further configured to create a preliminary metamodel by adding metaclass nodes to the preliminary metamodel for each said automatically identified node in the at least one model and a corresponding metaclass edge for each said automatically identified edge in the at least one model. The system may also be further configure to connect each said added metaclass edge to at least two said added metaclass nodes via first and second associations, the first and second associations having opposite directions and having respective multiplicities associated therewith. The system may be configured to detect whether multiple relationships exist by determining whether any of said added metaclass edges are connected to more than two added metaclass nodes. The system may also be configured to refine the preliminary metamodel when at least one multiple relationship exists so as to create a refined metamodel, but otherwise treating the preliminary metamodel as the refined metamodel.

There also are provided in certain example embodiments non-transitory computer readable storage mediums tangibly storing instructions that, when processed by at least one processor, execute the above-described and/or other methods.

These aspects and example embodiments may be used separately and/or applied in various combinations to achieve yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

The following description is provided in relation to embodiments which may share common characteristics, features, etc. It is to be understood that one or more features of any embodiment may be combinable with one or more features of other embodiments. In addition, single features or a combination of features may constitute an additional embodiment(s).

In certain example embodiments, a computer implemented algorithm is provided to generate a metamodel from example models. In certain example embodiments, the example models may be defined or represented in a specific format that facilitates parsing of the models by the algorithm for creation of a metamodel.

Figure 2A:
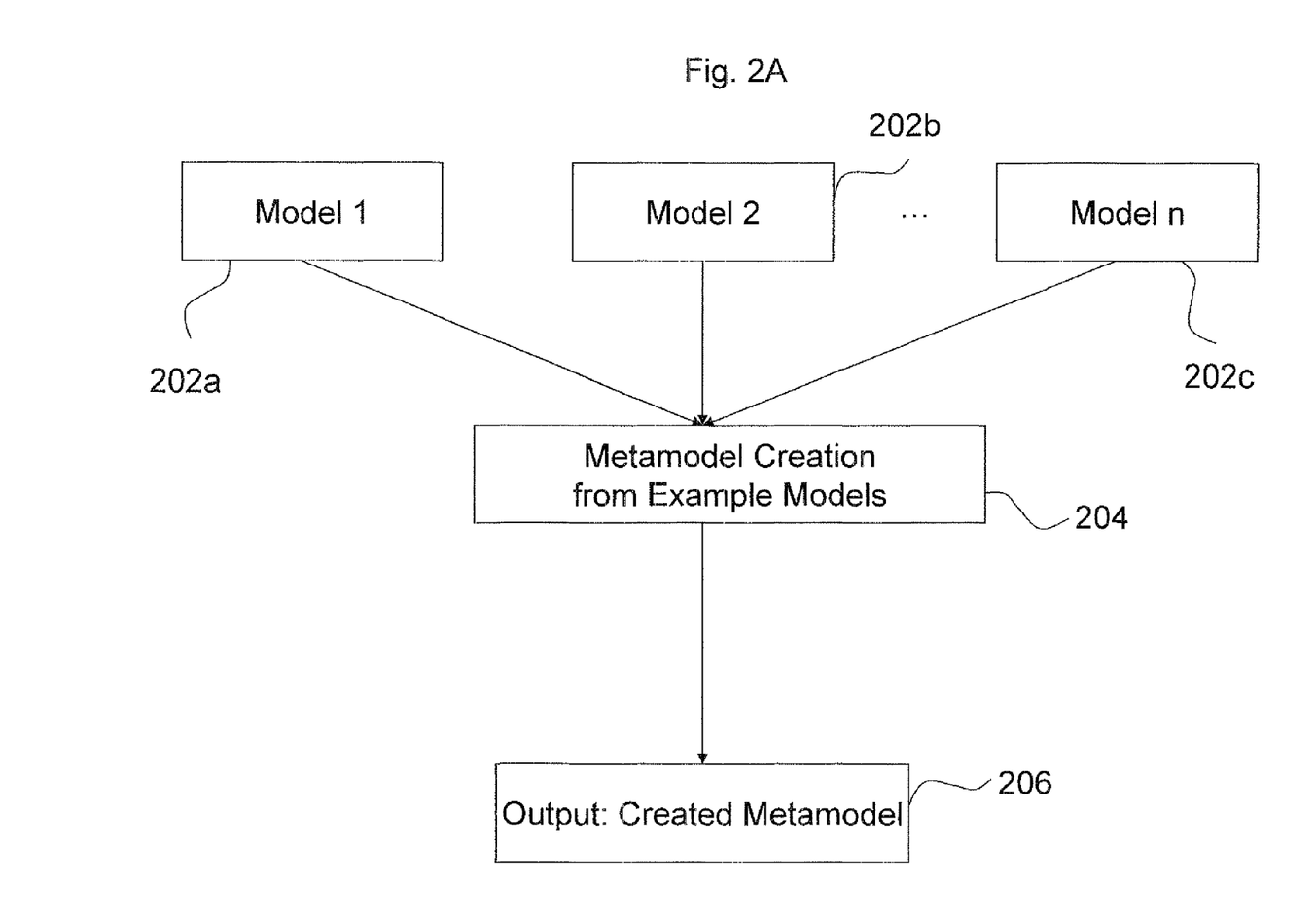
FIG. 2A is an example flowchart for creating a metamodel in accordance with certain example embodiments.

FIG. 2A is an example flowchart for creating a metamodel in accordance with certain example embodiments. Model 1 202a, model 2 202b and model n 202c are initially provided. The models are input into a metamodel creation tool from example models process 204, where a metamodel is created from the example models. Once the metamodel is created, it may be output for use in block 206.

The number of models that may be input into the process 204 may vary from 1 model to n number of models in different embodiments. Furthermore, in certain example embodiments, the provided example models may cover all language elements and relations that are to be covered in a generated metamodel. In certain example embodiments, elements/relationships/etc., e.g., entities, that are not specified within the set of provided example models may be automatically added during the generation process. For instance, a predefined set of elements and/or relationships may be included in the generation process. These predefined entities may be outside of the set of those elements/relationships in the example models. In certain example embodiments, the addition of these entities during the metamodel generation process may be a dynamic event based on rules that are predefined for the addition of the new entities. For example, a rule may be established and implemented that automatically includes an element X when element Y is within the example model set of elements.

In certain example embodiments, models provided to a metamodel generation process (e.g., models 202a, 202b, etc.) may be pre-existing models. For example, pre-existing models may be provided from existing business process management (BPM) models. Alternatively, or in addition, the provided models may be created for the metamodel generation process. For example, some models may be created and others may be pre-existing models. In certain example embodiments, the example models (provided, created, etc.) may be Business Process Models and notation (BPMN) models of, for example, a company's business process or the like.

Figure 2B:
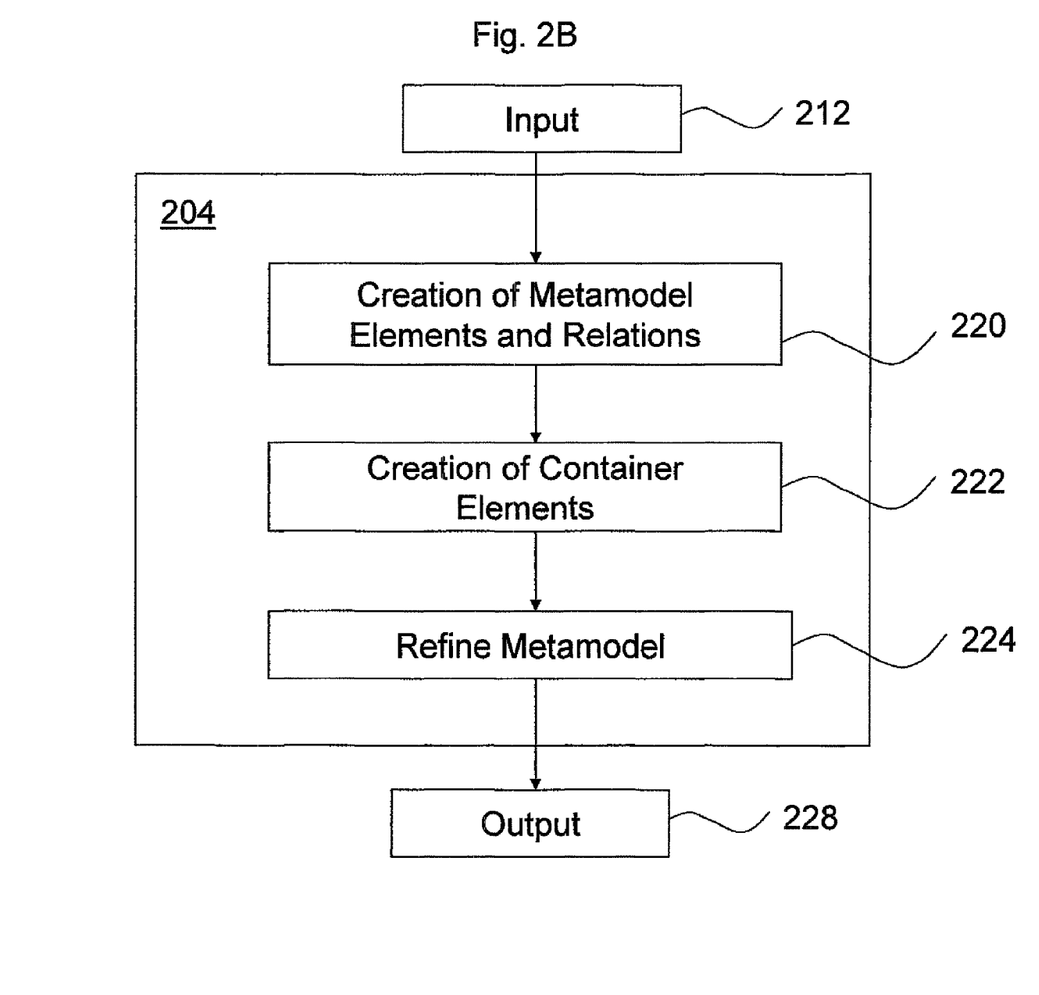
FIG. 2B is an example flowchart of the metamodel creation process of FIG. 2A in accordance with certain example embodiments.

FIG. 2B is an example flowchart of the metamodel creation process of FIG. 2A in accordance with certain example embodiments. The creation process 204 receives input from block 212. As discussed above, the input may be newly created or one or more received previously existing model(s). The input models are parsed in metamodel creation process 204, where metamodel elements and relations are created for the metamodel from the example models in block 220. The resulting temporary metamodel may define all the nodes, edges, and multiplicities of the provided example models. Container elements may be created for the newly created metamodel in block 222. Once the containers, elements, and relations are created, the metamodel is processed through a refinement or optimization block 224. In certain example embodiments, the associations in the temporary metamodel are refined or optimized, and/or OCL statements are added as appropriate.

Figure 3:
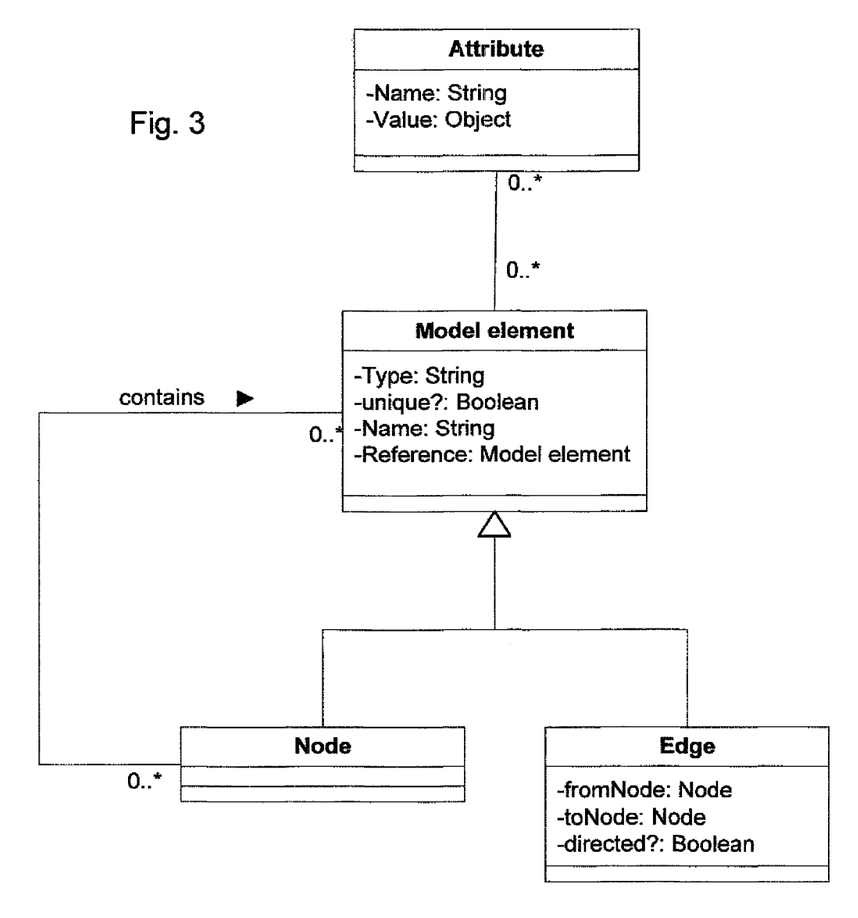
FIG. 3 is a metamodel of a Generic modeling language (GML) that may be used in order to create example models that serve as input for the creation of metamodels in accordance with certain example embodiments.

FIG. 3 is an exemplary metamodel of a modeling language in accordance with certain example embodiments. In certain example embodiments, the models provided to the metamodel generation process may follow a predefined representation or language. Such a technique may facilitate the parsing process when a metamodel is created from the example models. In FIG. 3, a Generic Modeling Language (GML) is shown and defined by a UML metamodel that may be used to create example models that serve as input for the creation of metamodels. The GML may allow, for example, for the representation of graphical models including nodes, edges, and container elements. Multiplicities also may be specified or represented in certain example implementations.

Figure 4:
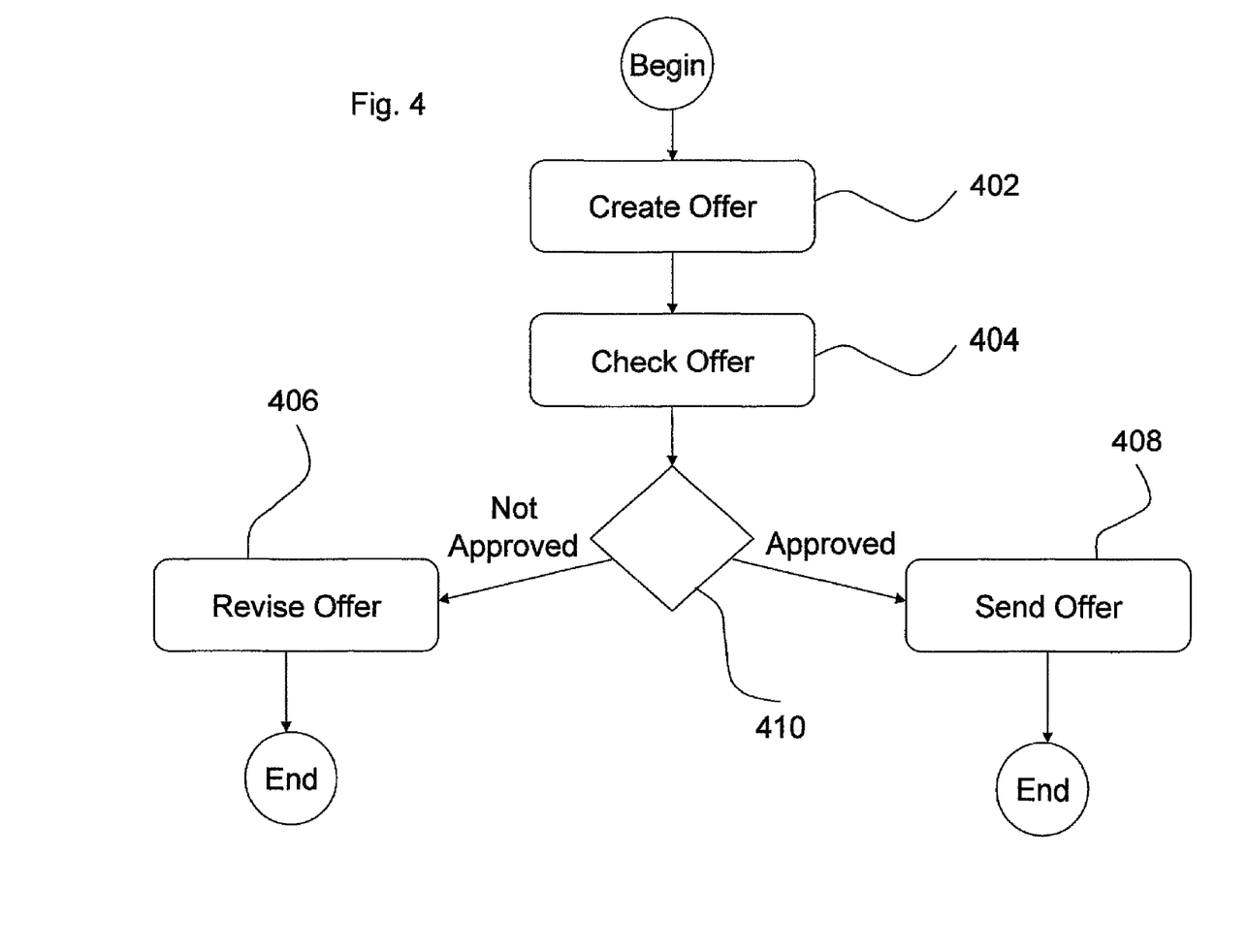
FIG. 4 is an example graphical model in accordance with certain example embodiments.

In certain example embodiments, the standard Business Process Model Notation (BPMN) may be used. Accordingly, one or more models may be specified for use with the GML. GML models may be expressed in an XML structure and/or in one or more other similar languages and/or structures. FIG. 4 is an example graphical model in accordance with certain example embodiments. An BPMN example model is shown in FIG. 4. An offer is created in block 402. The created offer is checked in block 404. Next, a decision is made at decision tree 410. This may be a manual decision (e.g., a manager deciding to accept an offer) or an automatic check (e.g., if certain predefined criteria are met such as if price conditions are met, the offer is approved). If the decision is approved, the offer is sent out in block 408. If the offer is not approved, then the offer is revised in step 406. A corresponding XML structure of the BPMN model of FIG. 4 is shown below.

```
<?xml version="1.0" encoding="UTF-8" ?>
- <GMLModel xmlns="http://www.providercommunity.com/...">
    - <metaInformation>
        <modelName xmlns="">BPMN-Example 1</modelName>
        <modelDescription xmlns="DPMN example model in
        GML" />
        <lastModification xmlns="">2010-10-
28T17:32:17+2:00</lastModification>
    </metaInformation>
    - <ModelElements>
        <node id="1" type="StartEvent" relid="2" />
        <edge id="2" type="SequenceFlow" fromNode= "1"
        toNode="3" />
        <node id="3" type="Task" relid="4" />Create
        Offer</node>
        <edge id="4" type="SequenceFlow" fromNode= "3"
        toNode="5" />
        ...
        <node id="7" type="Gateway" relid="6" />
        <edge id="8" type="SequenceFlow" fromNode= "1"
        toNode="3"
/>Not Approved</edge>
        ...
        <node id="18" type="Lane"
        contains="1,2,3,4,5,8">Sales</node>
    </ModelElements>
</GMLModel>
```

In certain example embodiments, once one or more models are provided, the automated generation of a metamodel is started. As noted above, the models may conform to a certain specification (e.g., the GML shown in FIG. 3). Alternatively, or in addition, the models collectively may cover all model elements that are to be included into the newly created metamodel (e.g., elements, relationships, etc).

In certain example embodiments, an integrity check may be performed or judgment call may be made on the sample model to determine whether the sample model is a connected graph. Accordingly, in certain example embodiments, invalid input models may be rejected as input for the creation of a metamodel. If an example model passes such a "sanity check," it may then be parsed and meta-classes for all of the nodes may be generated. In certain example embodiments, the created metaclasses may be identified by their name, which in turn may be derived from an attribute "type." For example, as shown in FIG. 3, the attribute type of the GML example model may be used. Thus, in certain example embodiments the result may be one metaclass for each type of node.

As there may be one metaclass for each type of node, all nodes may have an associated metaclass.

Next, a metaclass may be added to the metamodel for each edge in the sample models. In certain example embodiments, as with the nodes described above, the attribute type of the edge may be used. The current metamodel (now including nodes and edges from the example models) may show the edges and nodes as separate classes. This may be because these entities may have other attributes such as, for example names, roles, multiplicities, and/or the like, that can be assigned to the metaclass associated with the edge and/or node.

In certain example embodiments, the metaclass of each edge may be connected to nodes by two associations. The first association may go from the node to the edge, and the second association may go in the opposite direction. Accordingly, in certain example embodiments, the two associations may make it possible to distinguish between the number of nodes an edge may be connected to and the number of edges of the same type that a node may have.

These numbers (e.g., the number of nodes an edge may be connected to and the number of edges of the same type that a node may have) may be defined by multiplicities. When associations are created, they may be assigned multiplicities, e.g., (*, 0). In certain example embodiments, these multiplicities may be the largest minimum multiplicity and the smallest maximum multiplicity. Therefore, the example model is parsed and connections between nodes and edges that contradict these multiplicities may be recorded. In certain example embodiments, for each contradiction, the minimum multiplicity may be reduced and the maximum multiplicity may be increased.

Figure 5:
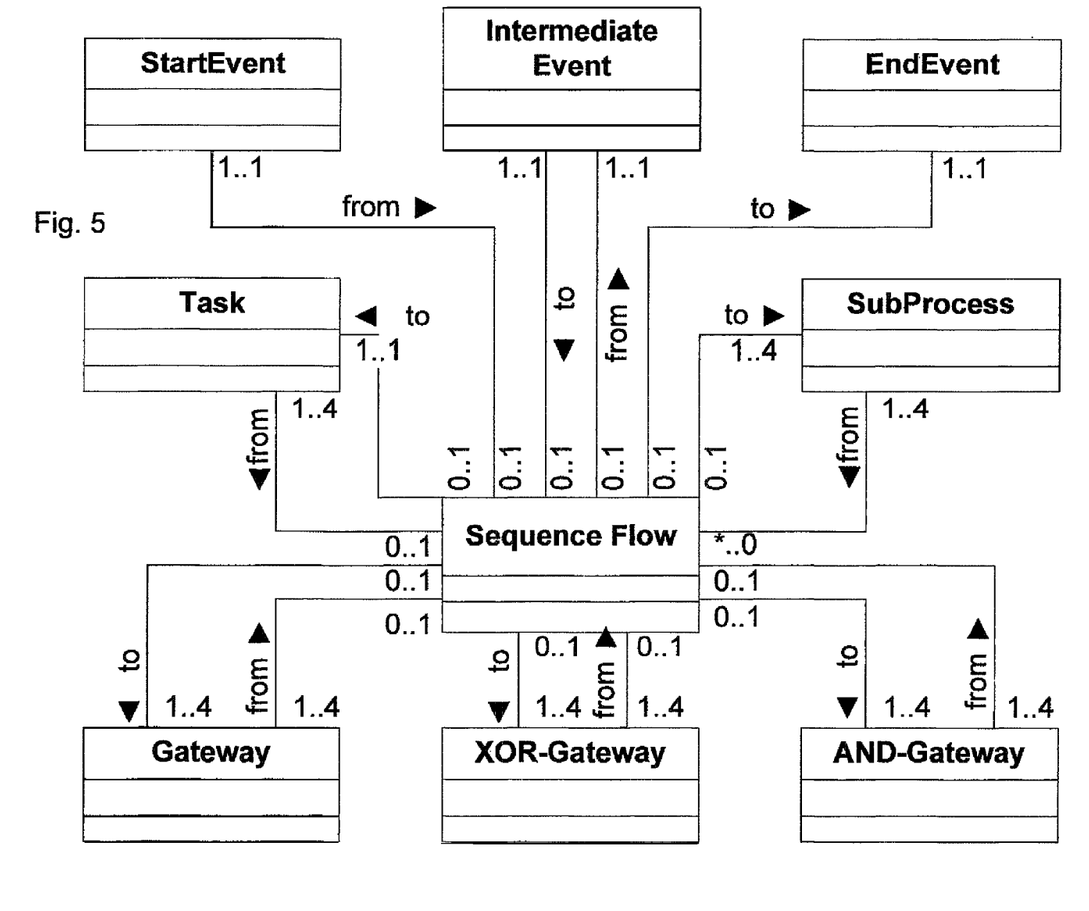
FIG. 5-7 are example metamodels created from example models at different steps in accordance with certain example embodiments.

It will be appreciated that following the processing described above, a meta-model may include classes for all of the nodes and edges including, for example, the attributes and cardinalities present in the sample models. FIG. 5 is an example metamodel created in accordance with certain example embodiments where the elements and relations of example models are inserted into the example metamodel. As will be appreciated from the FIG. 5 example metamodel, nodes, edges, and multiplicities are present. "To" and "from" relations also are provided.

In certain example embodiments, the metamodel creation process may include the creation of container elements and/or associations for container elements. In certain example embodiments, container elements may be expressed as model element that may include several other model elements or a group of model elements. A container element may have the relation "contains" in a metamodel to the model that it encompasses. Accordingly, for each pair of model element types that have a "contains" relation in an example model, a directed association "contains" between the equivalent metaclasses may be created.

Figure 6:
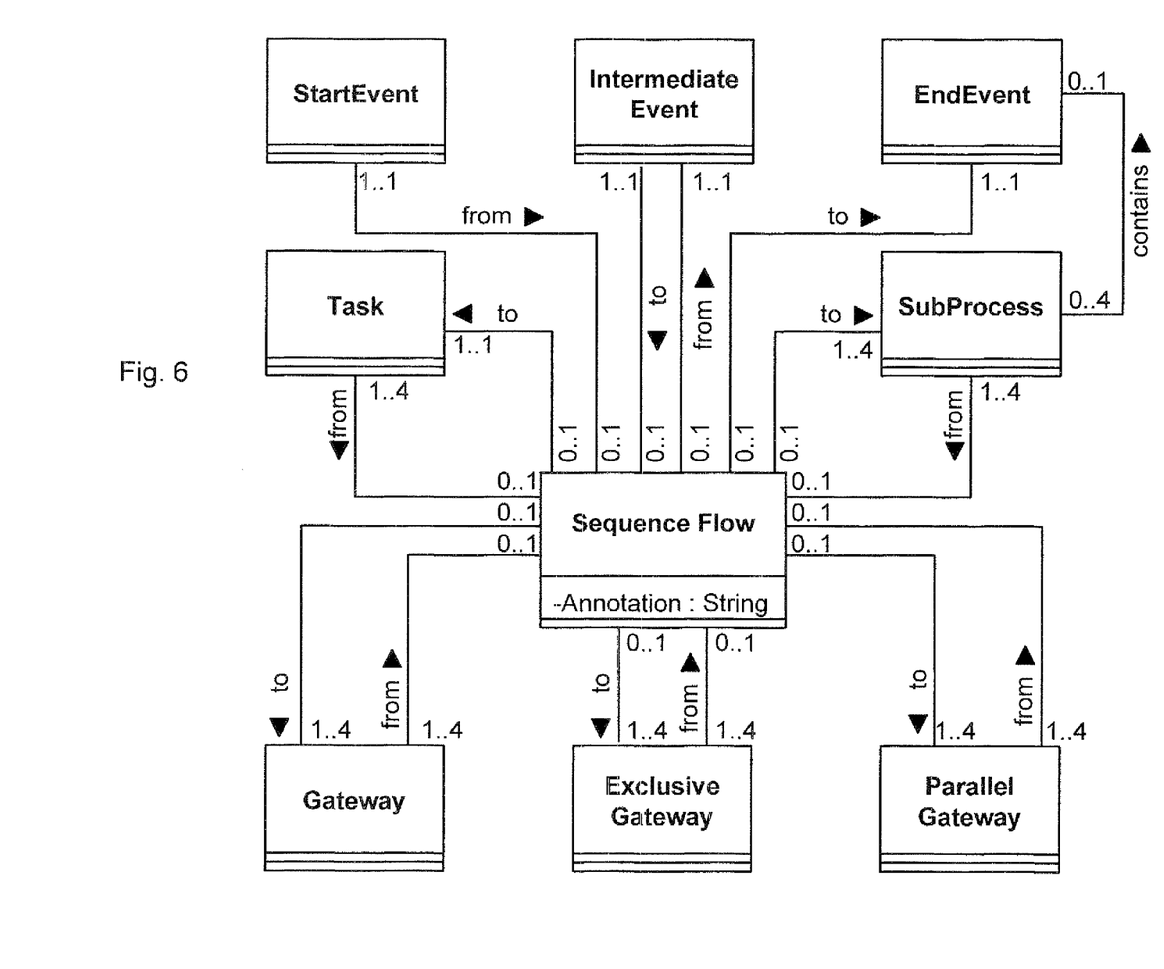

In addition, the "contains" association may have other multiplicities as well. These multiplicities may define in how many containers a specific model element may occur and/or the number of model elements of a specific type that a container element may encompass. In certain example embodiments, the multiplicities may be set to (*, 0) when the associations are created. In certain example embodiments, the minimum multiplicity may be reduced and the maximum multiplicity increased, according to the contradictions that are found in the current multiplicities. FIG. 6 is an example metamodel created from example models after the container elements are inserted and/or defined in accordance with certain example embodiments. As shown in the FIG. 6 example metamodel, a SubProcess contains an EndEvent.

Figure 7:
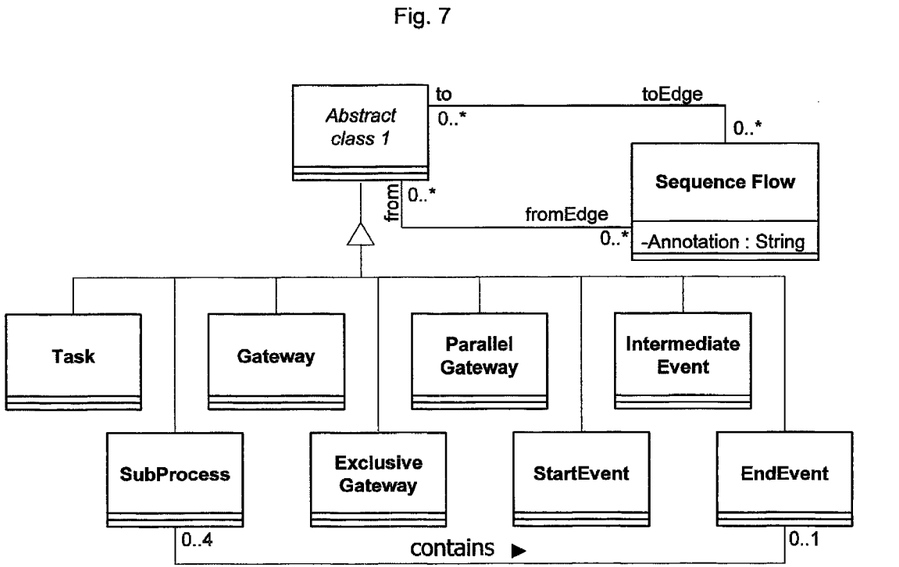

According to certain example embodiments, once the elements and relations are created and the container elements defined, the resulting metamodel may be refined or optimized. FIG. 7 is an example metamodel in a UML class diagram that is created after being refined in accordance with certain example embodiments.

According to certain example embodiments a metamodel covering all nodes, edges, and multiplicities, and/or container elements (e.g., necessary model entities) may be refined or optimized. In certain example embodiments this refinement process may help partially or fully optimize the created metamodel. In certain example embodiments, a metamodel including a metaclass of an edge that is associated with more than two metaclass nodes (e.g., a multiple relationship) may be further refined or optimized. Accordingly, the number of edges in the metamodel may be reduced and the metamodel may be further improved.

To carry out this refinement or optimization, in certain example embodiments, the OCL is used, which is part of OMG's MOF standard. In certain example embodiments, the process of refinement and/or adding OCL is performed after the above steps of creating elements and defining containers.

For example, in the case of a multiple relationship that can be refined or optimized, an abstract class may be added to the metamodel. Accordingly, in certain example embodiments, nodes that have an association to the metaclass of the edge of the multiple relationship may become inherited from the newly added abstract class. In certain example embodiments, the associations between the nodes and the edges of the multiple relationship may then be deleted. The metaclass of the edge may then have an association from and to the newly added abstract class. In certain example embodiments, the connection between nodes and edges and their multiplicities may be defined via OCL. Example OCL statements according to certain example embodiments may be as follows:

```
CONTEXT Sequence Flow
INV:        Self.from.oclIsKindOf(Gateway) AND
Self.to.oclIsKindOf(Task)
            IMPLIES Self.from.fromEdge->Size( ) = 0
            AND Self.to.toEdge->Size( ) = 1
            ...
INV:        Self.from oclIsKindOf(EndEvent) AND
Self.to.oclIsKindOf(EndEvent)
            IMPLIES Self.from.fromEdge->Size( ) = 0
            AND Self.to.toEdge->Size( ) = 0
```

Figure 8:
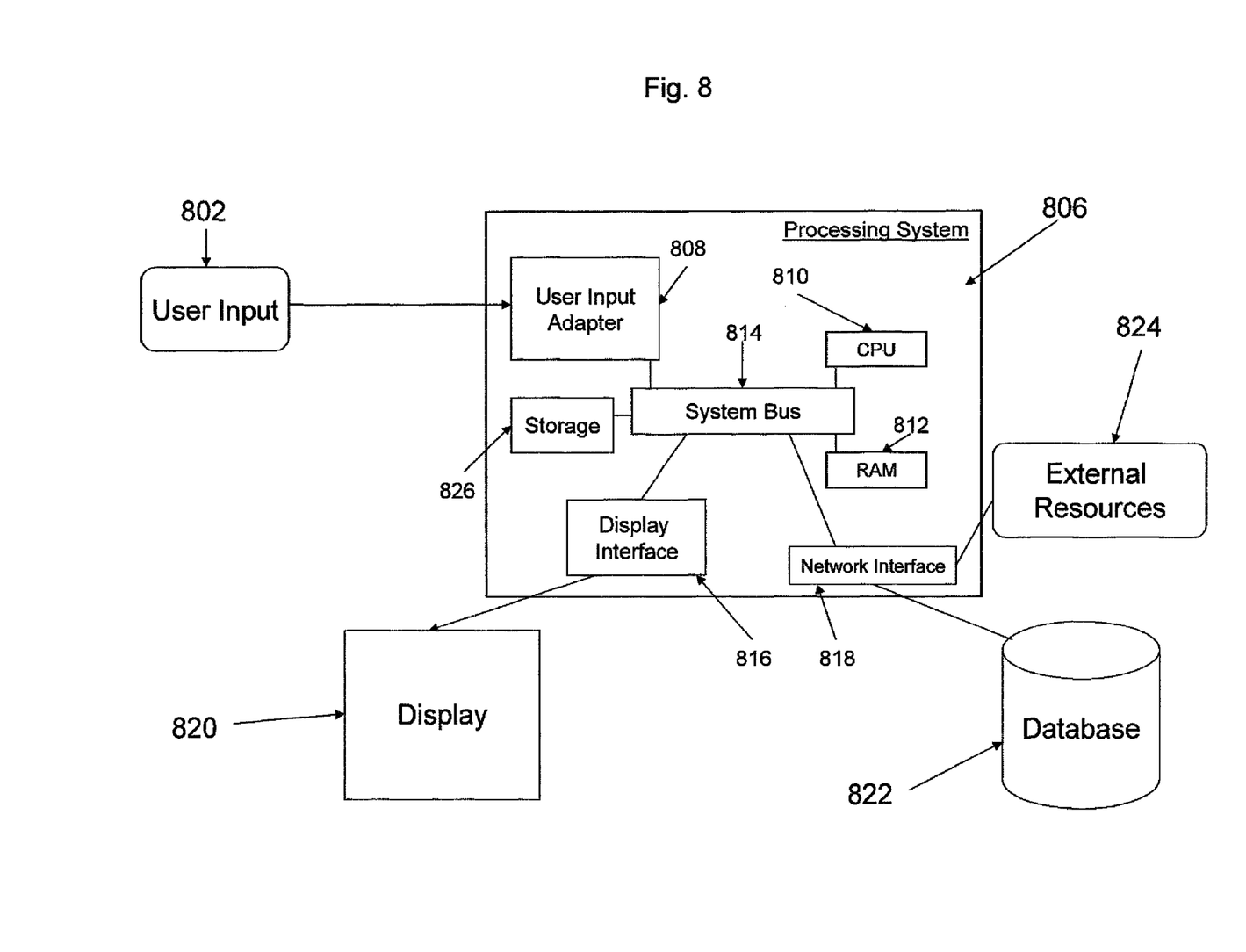
FIG. 8 is an example processing system for creating a metamodel out of example models in accordance with certain example embodiments.

FIG. 8 is an example processing system for creating a metamodel out of example models in accordance with certain example embodiments. User input 802 may be input from a user to create or retrieve example models. User input may also be supplied to make domain specific adjustments to metamodels that are created on the processing system 806. User input may also supply commands for creating metamodels from example models (e.g., starting a process as described above or the like). Accordingly, user input 802 may interface with the user input adapter that may be, for example, a USB port, PS/2 port, or the like. The user input may then be processed by the processing system 806.

As noted above, user input may trigger the start of a process to, for example, create a metamodel out of certain example models. An example metamodel creation process may be executed by processing system 806 by using CPU 810 (including at least one processor). The data may be moved over system bus 814, stored in RAM 812, and processed by at least one processor or CPU 810. The results (e.g., a metamodel) may then be output through various methods. In certain example embodiments, the resulting metamodel may be output through a display interface 816 to a display 820. This may be in the form of a graphical model in UML form. Alternatively, or in addition, the results and/or data may be sent through a network interface 818 to be stored in a database 822, or the like. In certain example embodiments, the results and/or data may be passed onto external resources 824. The external resources 824 may be resources such as, for example, an external application, another processing system, a notification system (e.g., email, etc), a business process management application, or the like.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the claims

What is claimed is:

1. A method of creating a metamodel for use with a processing system including at least one processor, the method comprising:
    automatically parsing nodes, edges, and multiplicities of at least one example model;
    creating a preliminary metamodel by (a) adding to the preliminary metamodel a corresponding metaclass node for each said node in the at least one model and a corresponding metaclass edge for each said edge in the at least one model, and (b) connecting each said added metaclass edge to at least two said added metaclass nodes via first and second associations, the first and second associations having opposite directions and having respective multiplicities associated therewith;
    detecting whether multiple relationships exist by determining whether any of said added metaclass edges are connected to more than two added metaclass nodes; and
    refining the preliminary metamodel when it is determined that at least one multiple relationship exists so as to create a refined metamodel, but otherwise treating the preliminary metamodel as the refined metamodel, wherein refining the preliminary metamodel includes reducing a number of metaclass edges and/or metaclass nodes in the preliminary metamodel by:
        inserting an abstract class into the preliminary metamodel for each said detected multiple relationship,
        causing the added metaclass nodes associated with each said multiple relationship to become inherited from a correspondingly inserted abstract class, deleting the first and second associations between the inherited metaclass nodes and the metaclass edges of the multiple relationships, and inserting a first abstract class association and a second abstract class association between the metaclass edge of the multiple relationship and the correspondingly inserted abstract class.

2. The method of claim 1, further comprising:

inserting at least one container element into the preliminary metamodel; and grouping into the at least one container element at least two of said added metaclass nodes and/or edges, the at least one container element having a multiplicity associated therewith.

3. The method of claim 1, wherein the first abstract class association and the second abstract class association are reciprocal associations to and from the abstract class and the metaclass edge associated and are created at each said detected multiple relationship.

4. The method of claim 1, wherein the refining of the preliminary metamodel is performed in connection with an object constraint language (OCL).

5. The method of claim 1, wherein each said added metaclass node and edge has an associated attribute type.

6. The method of claim 1, further comprising outputting the refined metamodel to a display and/or a non-transitory computer readable storage location.

7. The method of claim 1, further comprising creating the at least one model through a generic modeling language.

8. The method of claim 1, wherein the at least one model is received.

9. The method of claim 1, wherein nodes, edges, and multiplicities are automatically parsed from a plurality of example models.

10. The method of claim 9, wherein a single refined metamodel is automatically generated indirectly from the plurality of example models, each said example model being modeled in a generic modeling language.

11. The method of claim 1, wherein the refining of the preliminary metamodel further comprises inserting the abstract class into the preliminary metamodel between one of the metaclass nodes associated with the multiple relationship and at least two other metaclass nodes associated with the multiple relationship.

12. A metamodel creation system, comprising:

an adapter configured to receive user input;

a display; and at least one processor configured to:

automatically parse nodes, edges, and multiplicities of at least one example model;

create a preliminary metamodel by (a) adding to the preliminary metamodel a corresponding metaclass node for each said node in the at least one model and a corresponding metaclass edge for each said edge in the at least one model, and (b) connecting each said added metaclass edge to at least two said added metaclass nodes via first and second associations, the first and second associations having opposite directions and having respective multiplicities associated therewith;

detect whether multiple relationships exist by determining whether any of said added metaclass edges are connected to more than two added metaclass nodes; and refine the preliminary metamodel when at least one multiple relationship exists so as to create a refined metamodel, but otherwise treating the preliminary metamodel as the refined metamodel, wherein refining the preliminary metamodel includes reducing a number of metaclass edges and/or metaclass nodes in the preliminary metamodel by:

inserting an abstract class into the preliminary metamodel for each said detected multiple relationship, causing the added metaclass nodes associated with each said multiple relationship to become inherited from a correspondingly inserted abstract class, deleting the first and second associations between the inherited metaclass nodes and the metaclass edges of the multiple relationships, and inserting a first abstract class association and a second abstract class association between the metaclass edge of the multiple relationship and the correspondingly inserted abstract class.

13. The system of claim 12, wherein the processor is further configured to:

insert at least one container element into the preliminary metamodel; and group into the at least one container element at least two of said added metaclass nodes and/or edges, the at least one container element having a multiplicity associated therewith.

14. The system of claim 12, wherein the first abstract class association and the second abstract class association are reciprocal associations to and from the abstract class and the metaclass edge associated and the processor is configured to create the first and second abstract class associations at each said detected multiple relationship.

15. The system of claim 12 wherein the processor is further configured to create the at least one model through a generic modeling language.

16. The system of claim 12, wherein nodes, edges, and multiplicities are automatically parsed by the processor from a plurality of example models.

17. The system of claim 12, wherein the processor is further configured to insert the abstract class into the preliminary metamodel between one of the metaclass nodes associated with the multiple relationship and at least two other metaclass nodes associated with the multiple relationship.

18. A non-transitory computer readable storage medium tangibly storing instructions that, when processed by at least one processor, cause the processor to perform functionality comprising:

automatically parsing nodes, edges, and multiplicities of at least one example model;

creating a preliminary metamodel by (a) adding to the preliminary metamodel a corresponding metaclass node for each said node in the at least one model and a corresponding metaclass edge for each said edge in the at least one model, and (b) connecting each said added metaclass edge to at least two said added metaclass nodes via first and second associations, the first and second associations having opposite directions and having respective multiplicities associated therewith;

detecting whether multiple relationships exist by determining whether any of said added metaclass edges are connected to more than two added metaclass nodes; and refining the preliminary metamodel when it is determined that at least one multiple relationship exists so as to create a refined metamodel, but otherwise treating the preliminary metamodel as the refined metamodel, wherein refining the preliminary metamodel includes reducing a number of metaclass edges and/or metaclass nodes in the preliminary metamodel by:

inserting an abstract class into the preliminary metamodel for each said detected multiple relationship,
causing the added metaclass nodes associated with each said multiple relationship to become inherited from a correspondingly inserted abstract class,
deleting the first and second associations between the inherited metaclass nodes and the metaclass edges of the multiple relationships, and
inserting a first abstract class association and a second abstract class association between the metaclass edge of the multiple relationship and the correspondingly inserted abstract class.

\* \* \* \* \*